Patented Nov. 25, 1952

2,619,420

UNITED STATES PATENT OFFICE 2,619,420

ANIMAL AND POULTRY FEED CONTAINING AUREOMYCIN MASH

Thomas Hughes Jukes, Suffern, N. Y., assignor to American Cyanamid Company, New York, N. Y., a corporation of Maine No Drawing. Application September 17, 1949, Serial No. 116,413

8 Claims. (Cl. 99—5)

This invention relates to animal nutrition more particularly to an improved animal feed and to methods of preparing the new animal feed.

During the past several years it has become increasingly apparent that many animals, particularly chicks, turkeys, hogs, etc. thrive best on diets containing crude sources of animal protein. Attempts to supply the nutritional requirement of these animals by all-vegetable proteins from soybean meal, peanut meal, and the like have not been wholly satisfactory.

It is now accepted that the superior value of animal protein concentrates under the above conditions is not due to their content of amino-acids, but rather to the presence of certain vitamin-like substances which are not present in vegetable protein concentrates. These vitamin-like substances are commonly known as "animal protein factor."

Evidence of the lack of essential nutritional factors in all-vegetable protein diets includes poor hatchability of eggs from hens fed diets lacking in animal protein matter. Also, chicks from the eggs of such hens are not so vigorous as from eggs of hens fed an adequate diet. Chicks also grow faster and have a higher rate of survival when animal protein factor is included in their diet. Pigs require animal protein factor for good growth and efficient utilization of their feed. Calves require a similar factor during the early part of their growing period. Undoubtedly other animals also require nutritional elements in their diet that are associated with animal protein, but which appear to be lacking in vegetable protein feeds.

Animal proteins that are commonly included in animal feeds include those derived from fish meal, concentrated fish solubles, meat meal, liver meal, tankage and the like. These products are expensive, when compared with the cost of vegetable protein feeds, such as soybean meal and peanut meal, are not available in sufficient quantities to fulfill the requirements of the feedstuff industry, and are generally obnoxious to handle. Furthermore, the animal protein factor content of these animal products is variable and unpredictable. As a result there has developed a demand for something that could be added to an all-vegetable protein diet to supplement it so that it would be nutritionally adequate, cheaper, of standardized animal protein factor content, and otherwise more desirable than feeds containing animal protein matter. These demands are fulfilled by the present invention.

The nature of the growth factor associated with animal protein matter has not yet been fully determined. The isolation of a crystalline substance from liver now generally designated as vitamin $B_{12}$ gave rise to the belief that vitamin $B_{12}$ might be the animal protein factor, and while vitamin $B_{12}$ does appear to be a necessary growth factor and may be the factor that is present in many animal tissues that give rise to a considerable part of the growth stimulation that is observed when animals are fed fish and meat meals, it has been established that vitamin $B_{12}$ is not the only component of the present invention that leads to the remarkable growth results that are obtained.

It has been found that a livestock and poultry feed can be prepared from vegetable materials without animal protein adjuncts that is equally effective and possibly even better than a similar feed prepared using fish or animal protein matter, by simply adding to the vegetable feed a quantity of liquor, or concentrate thereof, which has previously been fermented by the fungus Streptomyces aureofaciens. This organism which is found in the soil has been fully described by Dr. B. M. Duggar in the Annals of the New York Academy of Science, vol. 51, Art. 2, pages 175–181, November 30, 1948. Although the primary value of Streptomyces aureofaciens is that it produces the antibiotic aureomycin in a fermentable medium containing a soluble carbohydrate, assimilable nitrogen, and the usual mineral salts of fermentation processes, it has been found that the mold also produces other factors which are essential for and stimulate the growth of animals kept on vegetable protein diets.

The nature of the growth stimulating substances produced by Streptomyces aureofaciens has not yet been fully determined. Although it has been found that Streptomyces aureofaciens produces vitamin $B_{12}$ it has also been established that only part of the growth response that is obtained with chicks, hogs, etc. fed on diets including some of the fermentation product of this organism is due to vitamin $B_{12}$. It has been discovered that Streptomyces aureofaciens fermentation liquor also contains another distinct vitamin substance which has been tentatively designated vitamin $B_{12b}$. The liquor also appears to contain either or both of vitamins $B_{12}$ and $B_{12b}$ in a conjugated form, possibly bound with amino acids, peptides, or proteins. Further than this, it also appears that the Streptomyces aureofaciens liquor contains still another vitamin or growth stimulating factor of a yet unidentified nature. J. Biol. Chem., Sept. 1949.

It is also probable that *Streptomyces aureofaciens* liquor contains various of the known vitamins, but the growth stimulation referred to herein is not that produced by these known factors. Of course, it is advantageous that these vitamins be present, but the present invention is not predicated upon the addition to animal feeds of known vitamins.

To illustrate the growth stimulating effects of liquors fermented by *Streptomyces aureofaciens* day-old chicks were fed on a basal diet of the following:

| | Grams |
|---|---|
| Yellow corn | 49 |
| Corn gluten meal | 5 |
| Distillers solubles | 4 |
| Alfalfa meal | 2 |
| Soybean meal | 28 |
| Calcium carbonate | 1.5 |
| Bone meal | 2.5 |
| Iodized salt | 0.25 |
| Manganese sulfate | 0.025 |
| Vitamin A and D oils | 1.0 |
| Choline chloride | .05 |
| Mixed vitamins [1] | .1 |

[1] The mixed vitamins were a crude mixture containing riboflavin niacin, and calcium pantothenate in adequate amounts for normal nutrition. The chicks fed the above basal diet weighed on an average 195 grams in twenty-eight days.

To the above basal diet was added 6% by weight of fish meal and 1% by weight of liver meal. The chicks fed this diet weighed an average of 252 grams in twenty-eight days, demonstrating the presence of desirable nutritional elements in fish meal and liver meal.

To the basal diet was added 2½% by weight of fermentation liquor from a *Streptomyces aureofaciens* fermentation which had been fermented under normal conditions for about sixty hours. The aureomycin had not been removed. Chicks fed this diet weighed on an average of 300 grams in twenty-eight days.

To the basal diet was added 7½% by weight of *Streptomyces aureofaciens* fermentation liquor. The chicks weighed 320 grams in twenty-eight days.

The above trials show that there are present in *Streptomyces aureofaciens* fermentation liquor growth stimulating factors not present in the basal diet and not present in, or inadequately supplied by, fish meal and liver meal. These trials also indicated that *Streptomyces aureofaciens* liquor can be used to replace fish meal and meat meals and that the latter are not dependable sources of the growth stimulating factors normally associated with animal proteins.

To demonstrate the fact that there are factors in *Streptomyces aureofaciens* fermentation liquor which give growth stimulating responses over and above those produced by vitamin $B_{12}$ trials were made on the growth of chicks using a basal diet of the following composition:

| | Grams |
|---|---|
| Soybean meal, solvent process | 70 |
| Yellow corn meal | 23.1 |
| Calcium carbonate | 2.0 |
| Salt mixture | 1.7 |
| Sodium chloride | 0.8 |
| Vitamin mixture in glucose [1] | 1.0 |
| Corn oil plus vitamins A, D, and E | 1.0 |
| Methionine (dl) | 0.3 |
| Choline chloride | 0.2 |

[1] The vitamin mixture contained 5 mg. each of niacin and calcium pantothenate, 1 mg. each of riboflavin, pyridoxine, folic acid, thiamine, biotin, and vitamin K.

After twenty-five days chicks fed the above basal diet weighed an average of 108 grams per chick.

To the above basal diet was added varying amounts of vitamin $B_{12}$. The average weights after twenty-five days were as follows:

| Addition per kilo of diet: | Grams |
|---|---|
| 15 micrograms $B_{12}$ | 254 |
| 25 micrograms $B_{12}$ | 268 |
| 50 micrograms $B_{12}$ | 270 |

To the basal diet was added varying amounts of dried *Streptomyces aureofaciens* liquor. The weights gained after twenty-five days averaged:

| Addition per kilo of diet: | Grams |
|---|---|
| 2 grams dried fermentation solids | 275 |
| 3 grams dried fermentation solids | 294 |
| 5 grams dried fermentation solids | 316 |

Similar results were obtained by using a dried residue prepared after removing aureomycin from the *Streptomyces aureofaciens* fermentation liquor. The following results were obtained at twenty-five days.

| Supplement: | Weight in grams |
|---|---|
| None | 129 |
| Vitamin $B_{12}$, 0.3 microgram [1] | 230 |
| Vitamin $B_{12}$, 0.5 microgram [1] | 242 |
| *S. aureofaciens*, dried fraction, 30 g. [2] | 288 |

[1] Injected weekly.
[2] Added per kilo of diet.

These results also shown that when *Streptomyces aureofaciens* liquor is added to diets containing animal protein concentrates and the several essential vitamins, better growth stimulation is obtained than when vitamin $B_{12}$ is added to the diet. This indicates that there is a factor or factors in the *Streptomyces aureofaciens* liquor which gives growth-stimulating effects in addition to those obtained by the use of vitamin $B_{12}$. Additional work not shown here further substantiates this fact.

Other trials using *Streptomyces aureofaciens* liquor and/or concentrate in the diet of other animals show that this fermentation material can be added to all-vegetable-protein diets and good growth stimulation obtained. For example, a group of pigs fed a starter diet including concentrated *Streptomyces aureofaciens* fermentation liquor and vegetable protein matter as the sole source of proteins made an average weight gain of ten percent more than a comparison group fed a similar diet without aureomycin liquor and including meat scrap and bone meal in place of soybean meal. At the same time the animals on the vegetable diet used six percent less feed. In other trials, pigs gained weight at a much faster rate on an all-vegetable protein diet supplemented with concentrated aureomycin liquor than on similar diets supplemented with vitamin $B_{12}$ and methionine.

The amount of *Streptomyces aureofaciens* fermentation liquor that is recommended for addition to animal feeds will vary considerably. The liquor itself may contain varying amounts of the growth stimulating factor described herein. Also, higher amounts of vegetable protein in the feeds require larger amounts of the *Streptomyces aureofaciens* fermentation liquor if the vegetable protein is to be adequately utilized. Also, the grower may wish to incorporate animal proteins in the feedstuff in less than adequate amounts. In such cases the *Streptomyces aureofaciens* liquor will be added to supplement the growth factor contained therein. Ordinarily the feed mixer will incorporate about 10 to 100 lbs. of *Streptomyces aureofaciens* fermentation liquor per ton of feed. When the feed contains animal proteins, this amount may be safely reduced. On the other hand, the maximum amount of *Streptomyces aureofaciens* liquor will be added when the feed contains the larger amounts of vegetable protein matter.

As previously indicated the *Streptomyces aureofaciens* liquor may be concentrated or even dried to reduce shipping costs or to facilitate mixing it with the feed. Ordinarily *Streptomyces aureofaciens* liquor contains approximately 4% solids and therefore two pounds of the dried fermentation liquor is approximately equivalent to fifty pounds of the fermentation liquor. The fermentation liquor itself is of complex composition. It usually contains before fermentation the following substances: a source of carbon, preferably a soluble sugar or starch such as glucose in amounts varying from about ½% to 5% by weight of fermentation medium; a source of nitrogen including one or more of amino acids, casein, meat extract, soybean meal, corn steep liquor, urea, nitrates, and the like in amounts from about 0.1% to 5% by weight of the fermentation medium; inorganic salts including phosphates, calcium, magnesium, potassium, iron, and the various trace elements usually present as impurities. A typical fermentation medium contains the following: 1% corn steep liquor; 1% sucrose; 0.2% $(NH_4)_2HPO_4$;

0.2% $K_2HPO_4$; 0.025% $MgSO_4 \cdot 7H_2O$; 0.1% $CaCO_3$.

The fermentation liquor may be used in mixing feeds without first removing the aureomycin if so desired. Ordinarily the aureomycin will be first recovered from the fermentation liquor by known means without removing substantial amounts of the growth stimulating factor contained therein. The aureomycin present in the ferementation liquor is non-toxic to animals and may in fact be desirable as an aid in warding off certain diseases. A method of removing the aureomycin from the fermentation liquor which has been fermented from twenty-four to seventy-two hours at a pH between 5 and 8, temperature at 28° C. is to increase the pH of the fermentation liquor to about 8.5 or higher and separate the liquor from the precipitate which forms. The latter contains most of the aureomycin. A considerable part of the growth promoting factors present in the liquor are retained in the solution. This solution may be added to animal feeds directly as described hereinabove or may be concentrated if desired or dried and then mixed with the animal feeds in the proportions desired. The precipitate may be extracted with dilute acids to recover further quantities of the growth factors for addition to feeds.

I claim:

1. An animal feed comprising edible vegetable protein matter and the growth promoting factors produced by the organism *Streptomyces aureofaciens*.

2. An animal feed consisting of edible vegetable material and *Streptomyces aureofaciens* fermentation liquor.

3. An anmial feed consisting of edible vegetable material and *Streptomyces aureofaciens* fermentation liquor from which aureomycin has been extracted.

4. An animal feed comprising edible vegetable protein matter and the growth promoting factors produced by fermentation of a nutrient liquor with *Streptomyces aureofaciens* corresponding to that present in from about ten pounds to 100 pounds of said liquor for each ton of said feed.

5. An animal feed comprising soybean meal and the growth promoting factors produced by *Streptomyces aureofaciens* when aerobically fermenting an aqueous liquor containing assimilable carbohydrates, a source of nitrogen, and essential mineral salts.

6. A method of preparing an animal feed capable of supplanting animal proteins in the nutrition of animals which comprises mixing fermented *Streptomyces aureofaciens* liquor with an edible proteinaceous material of vegetable origin.

7. A method of preparing an animal feed capable of supporting the normal growth of animals which comprises the steps of adding to an edible proteinaceous material of vegetable origin the dried residue of a liquor in which *Streptomyces aureofaciens* has grown.

8. A method of preparing an animal feed capable of supporting the normal growth of animals which comprises the steps of adding to an edible proteinaceous material of vegetable origin the fermentation liquor of *Streptomyces aureofaciens* from which aureomycin has been removed.

THOMAS HUGHES JUKES.

REFERENCES CITED

The following references are of record in the file of this patent:

UNITED STATES PATENTS

| Number | Name | Date |
|---|---|---|
| 1,587,101 | Woolner | June 1, 1926 |
| 1,921,911 | Hildebrandt | Aug. 8, 1933 |
| 2,082,711 | Spencer | June 1, 1937 |
| 2,182,989 | Jean | Dec. 12, 1936 |
| 2,202,161 | Miner | May 28, 1940 |
| 2,407,096 | Pfiffner | Sept. 3, 1946 |
| 2,449,340 | Tanner | Sept. 14, 1948 |
| 2,482,055 | Duggar | Sept. 13, 1949 |
| 2,483,248 | Stokes | Sept. 27, 1949 |
| 2,515,135 | Petty | July 11, 1950 |

OTHER REFERENCES

Patton, Jour. Nutr. 31, Apr. 10, 1946, pages 485–494.

Ott et al., Jour. Biol. Chem. 174, July 1948, pages 1047, 1048.

Stokstad et al., Jour. Lab. and Clinical Med., 33, 7, July 1948, pages 860–864.

Harned et al., Annals of the New York Academy of Science, Nov. 30, 1948, page 193.

Rickes et al., Science, 108, Dec. 3, 1948, pages 634–635.

Stokstad et al., Jour. Biol. Chem. 180, 2, Sept. 1949, pages 647–653.